US007418507B2

(12) United States Patent
Kruse

(10) Patent No.: US 7,418,507 B2
(45) Date of Patent: Aug. 26, 2008

(54) VIRTUAL RESOURCE SERVING OF CONSOLIDATED SERVER SHARES

(75) Inventor: David Kruse, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 10/740,974

(22) Filed: Dec. 18, 2003

(65) Prior Publication Data

US 2005/0138152 A1 Jun. 23, 2005

(51) Int. Cl.
*G06F 15/16* (2006.01)
*G06F 15/173* (2006.01)
*G06F 15/177* (2006.01)

(52) U.S. Cl. .................. 709/227; 709/203; 709/224; 719/310

(58) Field of Classification Search .............. 709/203, 709/224, 217–228; 719/310–315
See application file for complete search history.

(56) References Cited

U.S. PATENT DOCUMENTS

| 5,777,989 | A | 7/1998 | McGarvey |
| 5,781,738 | A | 7/1998 | Corn et al. |
| 5,819,030 | A | 10/1998 | Chen et al. |
| 5,893,107 | A | 4/1999 | Chan et al. |
| 5,903,753 | A | 5/1999 | Brammick et al. |
| 6,321,219 | B1 | 11/2001 | Gainer et al. |
| 6,360,230 | B1 | 3/2002 | Chan et al. |
| 6,408,298 | B1 | 6/2002 | Van et al. |
| 6,442,685 | B1 | 8/2002 | French et al. |
| 6,857,082 | B1* | 2/2005 | Josan et al. ................. 714/4 |
| 2003/0195942 | A1* | 10/2003 | Muhlestein et al. ......... 709/215 |
| 2003/0233378 | A1* | 12/2003 | Butler et al. ............... 707/200 |
| 2004/0006652 | A1* | 1/2004 | Prall et al. ................ 709/318 |
| 2004/0243646 | A1* | 12/2004 | Teodosiu et al. ............ 707/200 |

OTHER PUBLICATIONS

TS, Jay; Eckstein, Robert; Collier-Brown, David; "Using Samba" Chapters 6 & 7; 2nd Edition Published by O'Reilly & Associates, Feb. 2003, pp. 187-224.

* cited by examiner

*Primary Examiner*—Haresh N Patel
(74) *Attorney, Agent, or Firm*—Lee & Hayes, PLLC

(57) ABSTRACT

A system includes a server registry having one or more registered server names of associated network servers, an alias registry having one or more alias server names associated with each of the one or more registered server names, and a name resolution module resolving a requested server and share name to a destination server. Resolving the requested server and share names involves determining whether a requested server is registered and if the requested server is not registered, determining an alias server name corresponding to the requested server name.

27 Claims, 6 Drawing Sheets

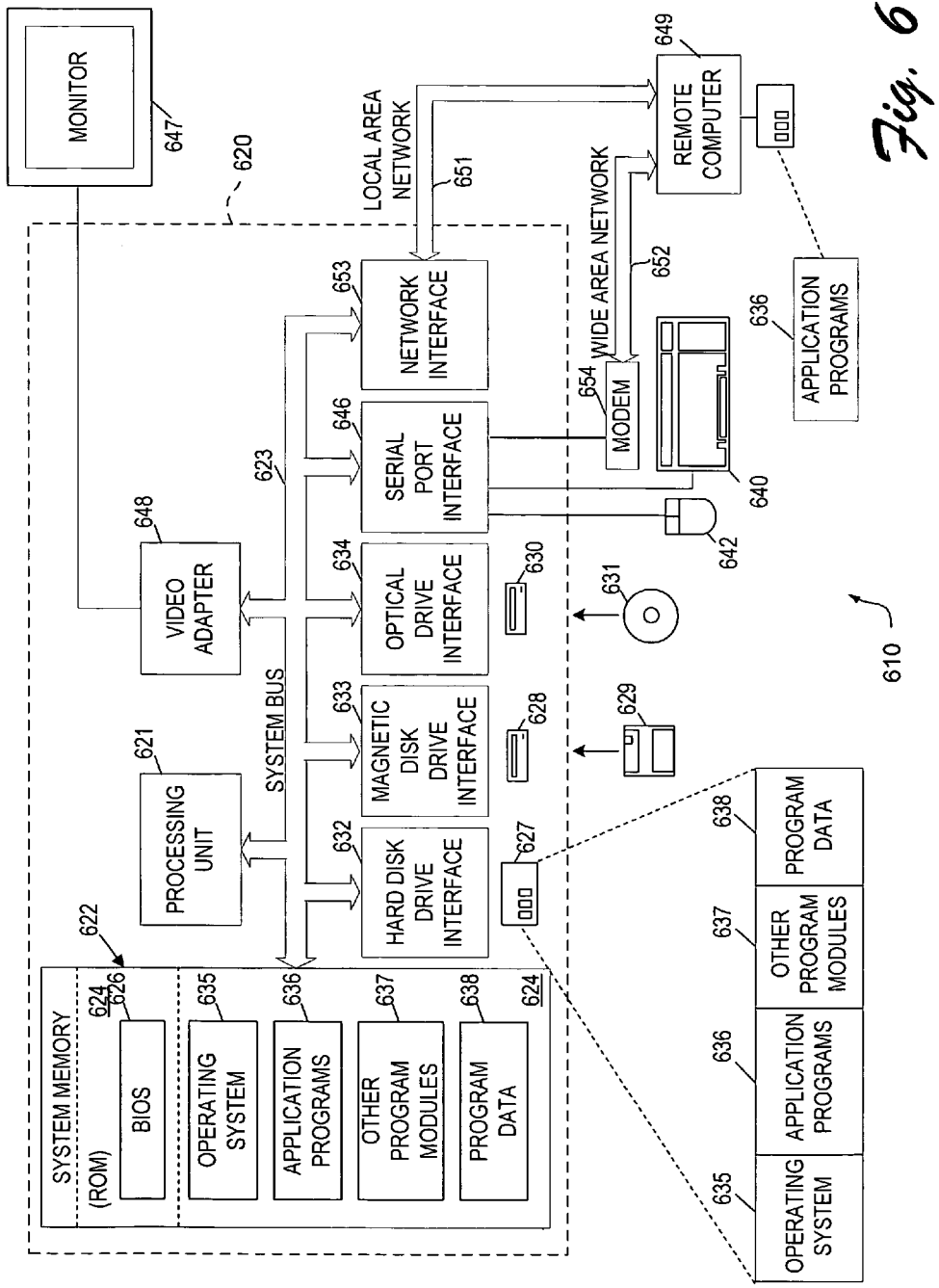

VIRTUAL RESOURCE SERVING OF CONSOLIDATED SERVER SHARES

TECHNICAL FIELD

The described subject matter relates to network servers and more particularly to virtual resource serving.

BACKGROUND

Server computers (or servers) provide data files, and other resources, to client computers (or clients) over a network. Servers present a set of resource or file names, called a namespace, in which all the names are unique, whereby the clients can access shared resources provided by the servers. Servers are accessed by clients using a server name or other server identifier. Over time, and as network configurations change, a server can become identifiable by more than one server name. As a result, server name resolution presents challenges for accessing resources on a network.

For example, old servers are often updated by replacing them with newer, faster servers. Unfortunately, when servers are consolidated, the namespaces can change such that namespaces provided by the old servers are no longer useable by clients of the new servers. Thus, server consolidation can render resources inaccessible to clients, unless the clients are updated to recognize the new namespaces. Updating the clients with new server names can be a time consuming, expensive task that can disrupt work flow at the clients. In addition, consolidation of servers can cause collisions among share names that are common among the consolidated servers.

When multiple servers are consolidated into fewer servers, a resource that was available on one of the old servers, but not available on the other old servers, may become available to clients of the other old servers through one of the new servers. Clients of the new servers may not know that new resources are available because of the consolidation. Even if the clients know of the new resources, it may not be apparent how to access the new resources. Thus, consolidating servers may have benefits, such as economies of scope, which are not fully realized by current systems.

In addition, a server can be identified by server names as well as an internet protocol (IP) address. In some configurations, a server name is mapped to an IP address by a Domain Name System (DNS) server. However, someone who knows the IP address of a server can access the server directly. Existing legacy software may include 'hard-coded' IP addresses to servers. In addition, some clients may use a Network Basic Input/Output System (NetBIOS) server naming convention that differs from a DNS server name. When server configurations change, as, for example, when a DNS server is installed, it may no longer be desirable or possible to directly access a network server using a previous IP address or a NetBIOS name. Unfortunately, identifying and updating all the clients and software that use NetBIOS names and IP addresses can be impractical.

SUMMARY

Implementations of systems and methods described herein solve the above, and other, problems and drawbacks by providing a virtual server scheme that provides for multiple server identifiers and redirects resource requests to an appropriate server. Share names are associated with server names, such that a unique combination exists in each pair of share names and server names. The virtual server scheme allows for a share name to be applied to multiple server names by use of a wildcard. Alias server names provide transparent redirection as server names change.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

A computer program product encodes a computer program for executing a computer process on a computer system. An exemplary computer program receives a request for a network resource, wherein the request includes a server name identifying a requested server and a share name identifying the network resource. The program determines whether the requested server is registered, and, if the requested server is not registered, the program may determine an alias server name corresponding to the requested server name.

An exemplary system includes a server registration module registering a server share using a server name and a share name. The server name may include a wildcard indicating that an associated share can be provided by multiple servers. The system may further include an alias registry that associates one or more alias server names with a target server name. The system may also include a default server name identifying a server to be used if a resource request includes a server name that is not found among registered server names.

A method includes receiving a request for a network resource, the request including a requested server name and a requested share name identifying the network resource, determining whether the requested server is registered, and determining an alias server name identifying an alias server corresponding to the requested server name, if the requested server name is not found in the server registry. The method may further include sending the request to the requested server, and searching a server registry having server entries, each entry comprising an available server name and an available share name to locate the requested server name and the requested server provided by one or more available servers.

BRIEF DESCRIPTION OF THE DRAWINGS

FIG. 6 illustrates an exemplary computer system that provides a suitable operating environment to engage in virtual resource serving over a network.

DETAILED DESCRIPTION

This disclosure describes a virtual resource serving scheme. The virtual resource serving scheme is described in the context of providing access to network resources a network, such as the Internet or a wireless network. However, the virtual resource serving scheme has general applicability to a wide variety of environments. Namespace alteration and/or collision can be a major problem encountered when servers are consolidated. Also, changes to server names over time can cause problems for clients and software that use previous server names. The virtual resource serving scheme described below provides for server resolution despite changes to server names and namespaces. Thus, changes to server names due to server consolidation, or otherwise, can be performed transparently to the clients.

Exemplary System Architecture

Figure 1:
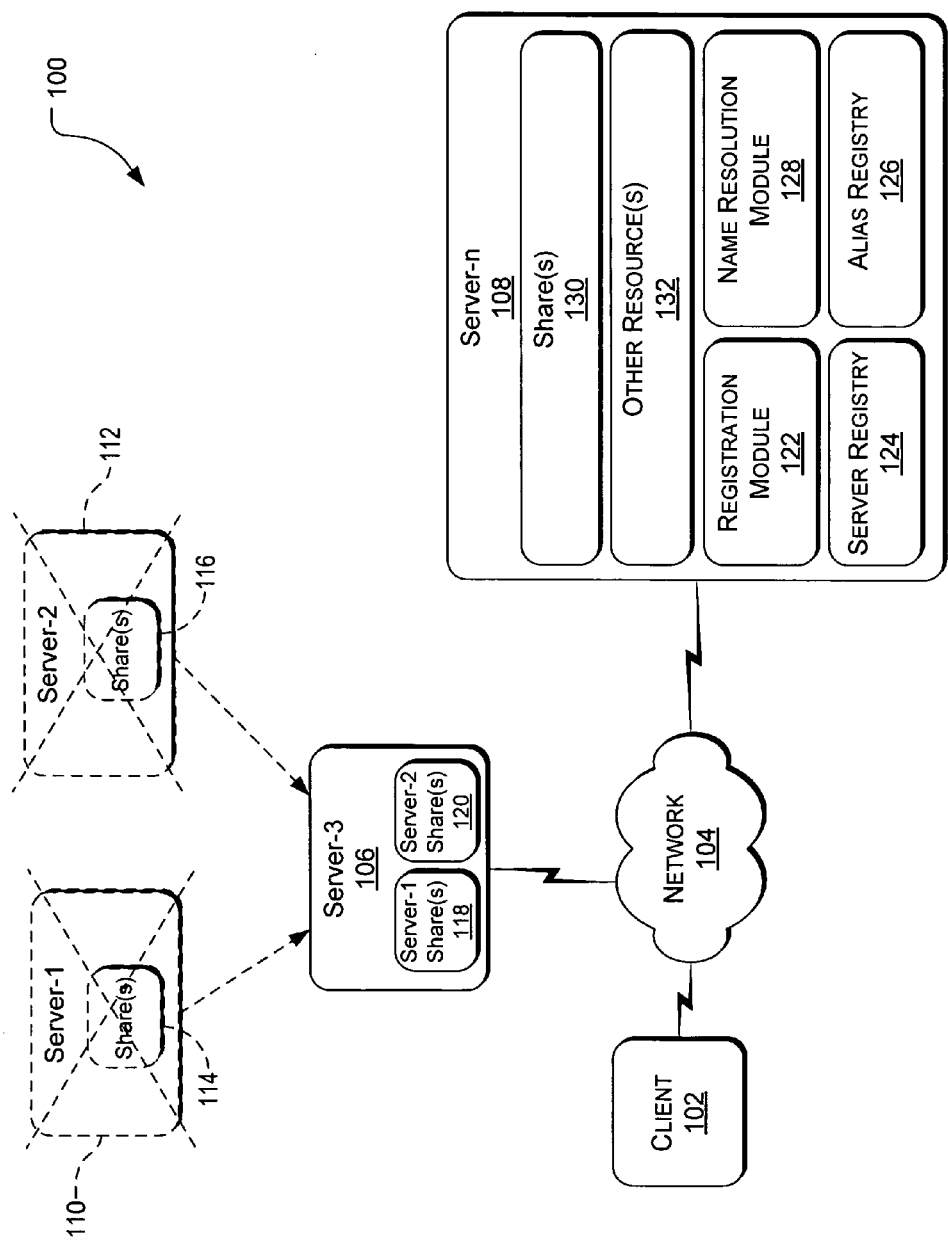
FIG. 1 is a block diagram of a suitable operating environment to implement a virtual resource serving scheme.

FIG. 1 is a block diagram of a suitable operating environment 100 to implement a virtual resource serving scheme. A client 102 communicates with one or more servers over a network 104 to access resources that can be used by the client 102. As illustrated, the client 102 communicates with server-3 106 and server-n 108. Server-3 106 and server-n include shared resources, called shares, which are accessible to the client 102. Shares are any computer-readable resources, such as, but not limited to, documents, executable files, image files, audio files, databases, or email files.

Server-1 110 and server-2 112, shown with dotted lines and crossed out, have been consolidated (i.e., migrated) onto server-3 106. Prior to consolidation, server-1 110 included one or more share(s) 114. Similarly, server-2 112 included one or more share(s) 116. Server-1 110 and server-2 112 might have been consolidated onto server-3 106 because server-3 106 is faster, smaller, cheaper, or some other reason. In accordance with a virtual resource serving scheme, the shares 114 from server-1 110 and the shares 116 from server-2 112 are made available on server-3 106 such that no changes need to be made at the client 102 as a result of the consolidation.

More specifically, the one or more share(s) 114 have been moved from server-1 110 to shares identified as 'server-1 share(s)' 118 on server-3. The one or more share(s) 116 have been moved from server-2 112 to shares identified as 'server-2 share(s)' 120 on server-3. The respective share(s) 114 and 116 are identified at server-3 106 using both a server name (e.g., Server-1, Server-2) and a share name, such that resource requests by the client 102 to share(2) 114 and/or 116 are transparently handled by server-3 106.

The process of identifying shares on a server using both a server name and share names is referred to herein as 'share scoping.' Share scoping is discussed in further detail below by use of a specific example.

Turning to server-n 108, the name 'server-n' is used herein to indicate that any number of servers may actually be in communication with the client 102 over the network. Server-n 108 may be a Domain Name System (DNS) server that facilitates server name resolution. Thus, the server-n 108 can receive network resource requests from the client 102 that include a server name and share name, and the server-n 108 can identify a network server associated with the resource request. Advantageously, the server-n 108 can facilitate server name resolution despite server consolidation, server name changes, use of multiple different server names for a single server, or unrecognized server names from the client 102.

As illustrated, server-n 108 includes a registration module 122 whereby servers on the network 104, such as server-3 106, can be registered to facilitate accessing resources on the registered servers. The registration module 122 can receive server registration information from a system administrator, the client 102, the server-3 106 or other computing devices on the network. The registration module 122 uses a server registry 124 and an alias registry 126 to store server registration information. A particular implementation of the registration module 122 is discussed below with respect to FIG. 2.

In general, the server registry 124 maintains server and share information to facilitate server name resolution. For example, the server registry 124 may include a DNS server name and share name associated with a network address of the actual server associated with the server name and share name. A particular implementation of the server registry 124 is discussed below with regard to FIG. 2.

Figure 2:
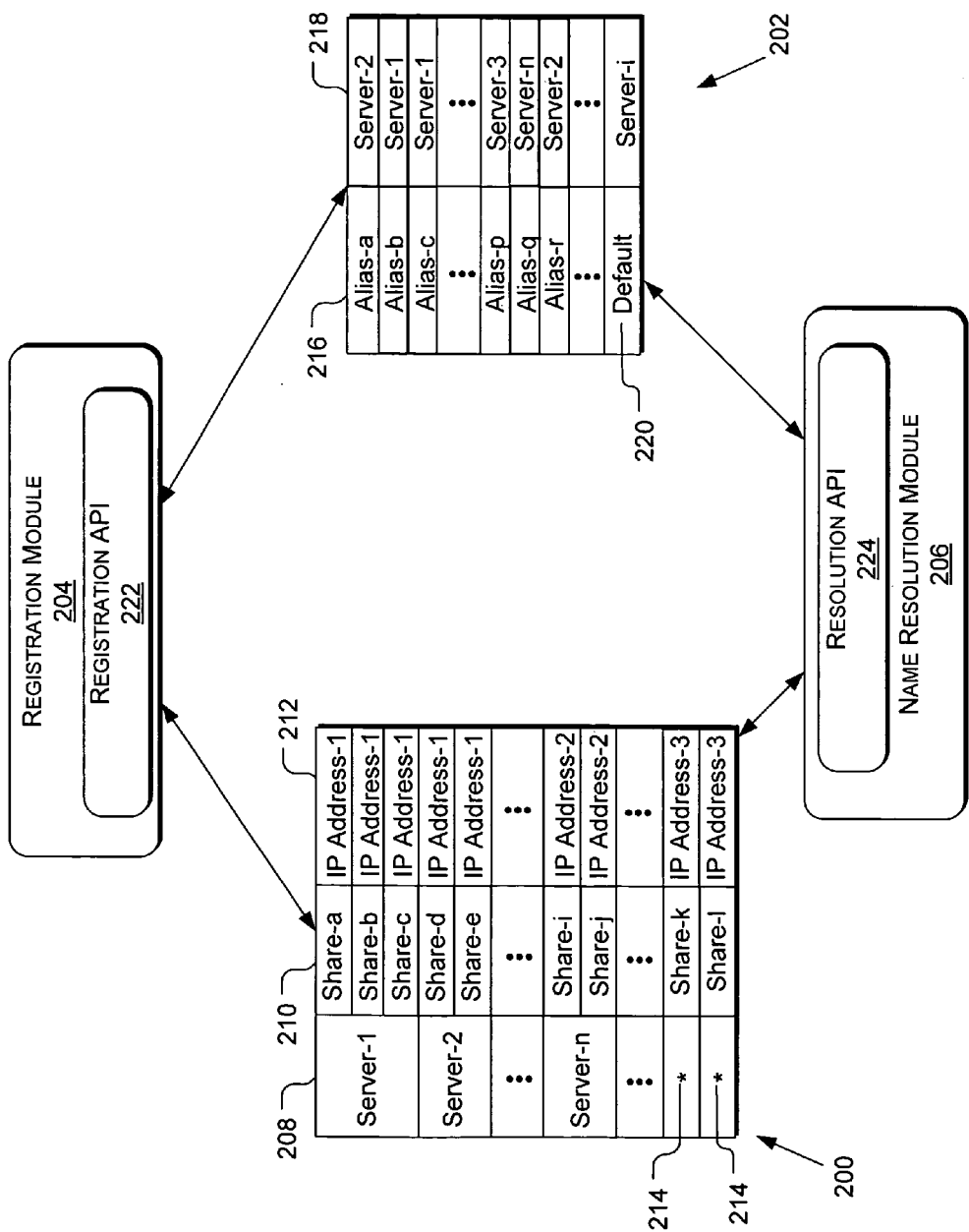
FIG. 2 illustrates and exemplary implementation of a server registry and an alias registry accessible by exemplary registration and name resolution modules.

The alias registry 126 includes aliases for network servers. Thus, if a network server may be referred to with more than one server name or identifier, the alias registry 126 can include all the server names and identifiers for the network server they identify. The alias registry 126 may also include a default server, which identifies a network server to be used if a received server name is not recognized. An exemplary implementation of the alias registry 126 is illustrated in FIG. 2, discussed below.

A name resolution module 128 uses the server registry 124 and the alias registry 126 to resolve server names and share names. In a typical scenario, the server-n 108 a network resource request from a network device, such as the client 102. The network resource request may be in a Universal Naming Convention (UNC) format, or another format. The name resolution module 128 attempts to determine a server identified by the requested server name and requested share name and direct or redirect the resource request to the identified server.

The name resolution module 128 may redirect the resource request to another server. In addition, the resource request may be directed to a server on which other server shares were previously consolidated; thus, the request server name may not equate to the name of the server on which the requested share actually resides. As a result, serving resources to a client is a virtual process, because the client may not actually receive resources from the server identified by the requested server name. An exemplary implementation of the name resolution module 128 is shown in FIG. 2 and discussed below.

The server-n 108 may also include one or more share(s) 130 and one or more other resource(s) 132. The share(s) 130 and other resource(s) 132 may be accessed by the client 102 using virtual resource serving through the name resolution module 128. Exemplary operations for registering server names, share names, aliases, and default server names are shown and discussed in detail below with respect to FIG. 3. Exemplary operations for using registered names, aliases and defaults for providing virtual file serving are shown and discussed in detail below with respect to FIG. 4.

Referring again to share scoping, a concrete example is now presented to illustrate how share scoping can work and benefits that may be attained. One goal of share scoping is to allow a single server to represent multiple virtual servers to incoming clients. Share scoping can be effectively applied in server consolidation and clustering. The naming convention used for scoped shares follows the Universal Naming Convention (UNC). Thus, a share named "SHAREA" for the server name "SERVER" would be represented as \\SERVER\SHAREA.

Assume that a company has three NT4 servers, having server names, shares, and share names shown in Table 1:

TABLE 1

Exemplary Servers and Shares to Illustrate Share Scoping

| ServerName: NT4-A Shares: | ServerName: NT4-B Shares: | ServerName: NT4-C Shares: |
|---|---|---|
| Public = c:\public | Public = c:\public | Private = c:\private |
| Docs = c:\docs | Pictures = c:\pics | Files = c:\files |
|  | Data = c:\data |  |

The company is going to consolidate these servers NT4-A, NT4-B, and NT4-C into a single server named "Blackcomb". Assume that server Blackcomb has a very large disk. Consolidation includes copying the contents of the NT4-A, NT4-B, and NT4-C servers' disks to the Blackcomb server. A system administrator may decide to use a sub-directory convention, so that directory c:\nt4-a on Blackcomb represents directory c:\ from NT4-A, directory c:\nt4-b on Blackcomb represents directory c:\ from server NT4-B, and so on.

Without using share scoping, NT4-A shares may be configured and identified on the Blackcomb server as follows:

Public=c:\nt4-a\public
Docs=c:\nt4-a\docs

Using the above configuration and identification for server shares from server NT4-A, a collision may arise between the 'Public' share from NT4-A and the 'Public' share from NT4-B. When the administrator adds another share named 'Public' from NT4-B, the share name 'Public' is no longer unique, because the share name 'Public' has already been configured to identify the Public share from the NT4-A server.

Another issue that arises in the scenario when share scoping is not used involves an apparent change to the namespace as viewed by a client. For example, without share scoping, when a client enumerates the shared resources on the NT4-A server may receive a list of the six shares: Public, Docs, Pictures, Data, Private, Files. From the client's perspective, there are four shares (i.e., Pictures, Data, Private, Files) that appear to be part of NT4-A, but did not exist before the consolidation. Such a result from server consolidation may cause user confusion.

To address the foregoing issues, shares are beneficially configured on the Blackcomb server using share scoping. With share scoping, when the administrator is adding the shares, the shares are qualified with a server name. Thus, for example, the shares on the Blackcomb server may be configured and identified as follows:

```
\\NT4-A\Public = c:\nt4-a\public
\\NT4-A\Docs = c:\nt4-a\docs
\\NT4-B\Public = c:\nt4-b\public
\\NT4-B\Pictures = c:\nt4-b\pics
\\NT4-B\Data = c:\nt4-b\data
\\NT4-C\Private = c:\nt4-c\private
\\NT4-C\Files = c:\nt4-c\files
```

As illustrated, using share scoping, seven shares are created on Blackcomb, wherein the seven shares are identified by \\NT4-A\Public, \\NT4-A\Docs, \\NT4-B\Public, \\NT4-B\Pictures, \\NT4-B\Data, \\NT4-C\Private, and =Thus, each of the shares has a unique share name, resulting in no name collision. In addition, the namespace remains identical to the namespace before the consolidation. Thus, a client enumerating shared resources on NT4-A will receive share names 'Public' and 'Docs'. An enumeration of shared resources on NT4-B will result in the other 'Public' share along with 'Pictures' and 'Data'.

In one implementation, enumerating the shared resources on the Blackcomb server will not return any of the consolidated shares. Shares can be added to the Blackcomb name if Blackcomb is to be added as a server. As discussed further below, a server name can be represented with a wildcard name. A wildcard name includes a wildcard symbol or set of symbols, which represent any symbol. For example, a wildcard share can be represented by a UNC share name '\\*\SHAREB', wherein the symbol '*' represents a wildcard server name. If the server name is not specified, the server name is assumed to be a wildcard. A wildcard share is visible and accessible through any virtual server name. Thus, for example, if a wildcard name is set up for a share on the Blackcomb server, a share name will show up on all registered server names.

In an exemplary clustering scenario, assume the administrator has a 2-node cluster named NTSTRESS that is hosted by server nodes NTSTR0 and NTSTR1. Server NTSTR1 is also used to store a music collection on the share "WMA". The NTSTRESS node hosts two shares, "RESULTS" and "SYMBOLS". The administrator wants the shares for NTSTRESS to only be accessible when the user accesses the server with the cluster name (NTSTRESS.) In addition, the administrator doesn't want the music collection being visible to all the users using the cluster. Using share scoping, the administrator sets up the cluster shares using qualified server names. Three shares are added, \\ntstress\results, \\ntstress\symbols, and \\ntstr1\wma. If the cluster fails from NTSTR1 to NTSTR0, the NTSTRESS shares are removed and added to NTSTR0, but the WMA share remains. Thus, share scoping provides virtual separation between the cluster virtual server name and the physical node name that is currently handling it.

FIG. 2 illustrates and exemplary implementation of a server registry 200 and an alias registry 202 that are accessible by an exemplary registration module 204 and an exemplary name resolution module 206. In general, the registration module 204 populates the server registry 200 and alias registry 202 server configuration information upon server power-up, or sometime prior to, or during, server operation. After the server registry 200 and the alias registry 202 have been populated, they can be used by the name resolution module 206 to perform virtual resource serving to provide access to server shares over a network.

The exemplary server registry 200 includes a list of one or more registered server names 208, a list of associated share names 210, and a list of associated network addresses 212. The server registry 200 may also include entries for wildcard server names 214, illustrated with asterisks '*' in FIG. 2. The wildcard entries 214 can include any symbol or set of symbols, which are preferably unlikely to be used for actual server names.

The alias registry 202 includes a list of one or more alias server names 216 and a list of associated target or destination server names 218. The alias registry 202 may also include a 'default' entry 220, which identifies a default server name to be used if an unrecognized server name is requested. The alias registry 202 and the server registry 200 may be implemented in software, hardware, firmware, or any combination thereof. For example, the server registry 200 and the alias registry 202 may comprise one or more data structures in random access memory (RAM). A registration application programming interface (API) 222 in the registration module 204 receives server registration information and updates the server registry 200 and/or the alias registry 202 accordingly.

For adding a new share to the server registry 200, or querying or enumerating the server registry 200 for share information, the data structure shown below can be used. The data structure is called 'SHARE_INFO'.

```
typedef struct _SHARE_INFO{
    LMSTR              netname;
    DWORD              type;
    LMSTR              remark;
    DWORD              permissions;
    DWORD              max_uses;
    DWORD              current_uses;
    LMSTR              path;
    LMSTR              passwd;
    LMSTR              servername;
    DWORD              reserved;
    PSECURITY_DESCRIPTOR security_descriptor;
} SHARE_INFO, *PSHARE_INFO, *LPSHARE_INFO;
```

Most relevant to this discussion is the data field labeled 'servername'. In one implementation, the 'servername' field can be set to a designated wildcard symbol, such as NULL or "*" to signify a wildcard share. Otherwise, the 'servername' should be a textual name representing the name of the virtual server. In one implementation, if the 'servername' is a DNS name, the server name can be truncated at its first leftmost period (i.e., "."). In this or another implementation, an IP address can be setup as an allowable name and may or may not be truncated.

An exemplary implementation of the resolution API 224 uses a server name as a simple text field in a lookup into the server registry 200. For example, when a client requests a share on a server, the resolution API 224 looks up the requested server name in the server registry 200. The resource request is sent to the requested server if the requested server name is found in the registry. Using share scoping, discussed above, both the requested server name and the requested server share can be combined to identify the proper registered share; that is, the share name can be qualified with the server name to identify the correct share in the server registry.

With more specific reference to the alias registry 202, the alias registry 202 includes associations between one or more aliases and one or more server names. For example, assume a server has server name JSMITH-DEV. Aliases "jsmith-dev.ntdev.corp.microsoft.com" and "jsmith-dev.dns.microsoft.com" could be registered in the alias registry 202 and thereby associated with server JSMITH-DEV. As another example, an Internet Protocol address "157.59.254.232" can be registered as an alias to JSMITH-DEV in the alias registry 202. This way, access by any of those names would be referred to the name "JSMITH-DEV".

Continuing with the example, when a client requests "jsmith-dev.ntdev.corp.microsoft.com", "jsmith-dev.dns.microsoft.com", or "157.59.254.232", the name resolution API 216 can resolve any of these names to server name JSMITH-DEV, using the alias registry 202. Thus, the alias registry 202 allows for the handling of cases where DNS and Network Basic Input/Output System (NetBIOS) names are different, and also allows for IP addresses to be mapped to the appropriate server name.

An exemplary server alias structure for setting server aliases is:

```
typedef struct SERVER_ALIAS_INFO {
    LMSTR     srvai_alias;
    LMSTR     srvai_target;
    BOOLEAN   srvai_default;
} SERVER_ALIAS_INFO, *PSERVER_ALIAS_INFO,
  *LPSERVER_ALIAS_INFO;
```

In the above exemplary structure, the field "srvai_alias" represents an alias server name, the field "srvai_target" represents a target or destination server name corresponding to the alias, and the "srvai_default" field indicates whether a default server can be used if no alias exists. In an implementation of the SERVER_ALIAS_INFO structure, the alias is a unique name. The alias name or target name can be a NetBIOS name, such as "JSMITH-DEV", a Domain Name System (DNS) name, such as "JSMITH-DEV.NTDEV.CORP.MICROSOFT.COM", or an IP address, such as "127.0.0.1".

In one implementation of the SERVER_ALIAS_INFO structure, the target should be a NetBIOS-style name. The default (i.e., 'srvai_default') bit can be set on any mapping, and that mapping can be used if an alias is not found to match the requested server name. In this implementation, it is legal to set up an alias with a NULL alias name and a non-null target name if default is set to TRUE, but only one such alias can be established.

As discussed, a server name can be established as a "default" server. A default entry in the alias registry 202 identifies a server name that will be presented when a client requests an unrecognized server name. A default server is separate from the wildcard shares because wildcard shares represent share names valid on all server names. By contrast, a default server is a server that will be selected if the requested server name is not found in the server registry 200, there is no wildcard server name for the requested share, and the requested server is not an alias for an actual server.

One implementation of the registration API 222 includes one or more computer-executable functions for registering servers, shares, and aliases. Exemplary functions are shown and described as follows:

| NetServerAliasAdd |
|---|
| NET_API_STATUS NET_API_FUNCTION<br>NetServerAliasAdd(<br>    IN  LMSTR    servername,<br>    IN  LPBYTE   alias<br>); |

The NetServerAliasAdd function can be called to add an alias to the alias registry 202. The 'servername' parameter identifies the server where the resource request will be processed. The 'alias' parameter should be a valid PSERVER_ALIAS_INFO structure as described above.

| NetServerAliasDel |
|---|
| NET_API_STATUS NET_API_FUNCTION<br>NetServerAliasDel(<br>    IN  LMSTR    servername,<br>    IN  LPBYTE   alias<br>); |

The NetServerAliasDel function can be called to delete an alias server name from the alias registry 202. The 'servername' parameter identifies the server handling the resource request. The 'alias' parameter should be a PSERVER_ALIAS_INFO structure as described above. The only required field in the PSERVER_ALIAS_INFO structure is the srvai_alias field, as the 'srvai_target' and 'srvai_default' parameters can be ignored.

| NetServerAliasEnum |
| --- |
| NET_API_STATUS NET_API_FUNCTION NetServerAliasEnum(    IN   LMSTR         servername,    OUT LPBYTE       *bufptr,    IN   DWORD        prefmaxlen,    OUT LPDWORD      entriesread,    OUT LPDWORD      totalentries,    IN OUT LPDWORD   resumehandle ); |

The function NetServerAliasEnum can be called to enumerate a list of all server shares that have alias entries in the alias registry 202. The 'servername' parameter identifies the server where the resource request will be processed. The 'bufptr' parameter is a pointer that points to an array of SHARE_ALIAS_INFO structures. A buffer that will be of share information structures will be allocated for the caller. The 'prefmaxlen' parameter indicates the largest size buffer the caller would like, or 0xFFFFFFFF (Hexadecimal) for no preference.

The 'entriesread' parameter indicates how many entries are returned to the caller. The 'totalentries' parameter indicates the total number of entries that should be returned. The 'resumehandle' parameter should be 0 for a first call to the function, and can be incremented for subsequent calls to the function.

Exemplary Operations to Facilitate Virtual Resource Serving

Figure 3:
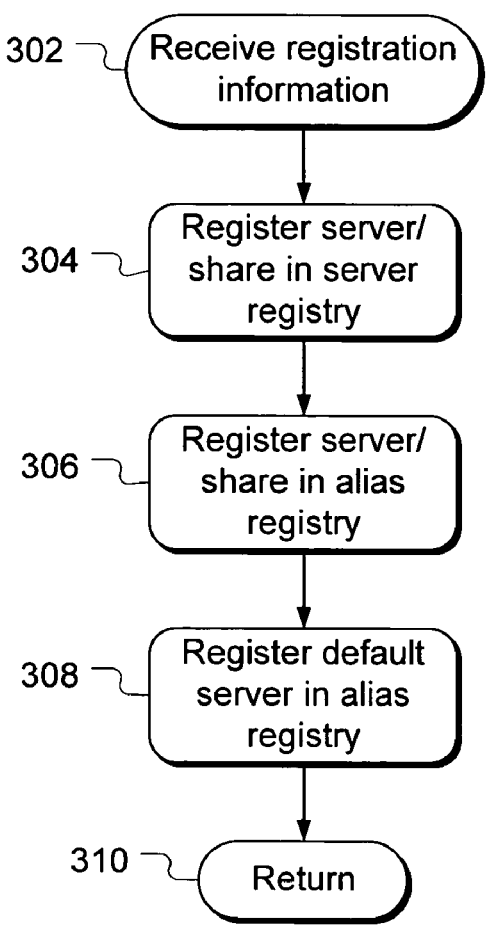
FIG. 3 illustrates a registration algorithm that may be used to register servers, alias names, and a default server.
Figure 4:
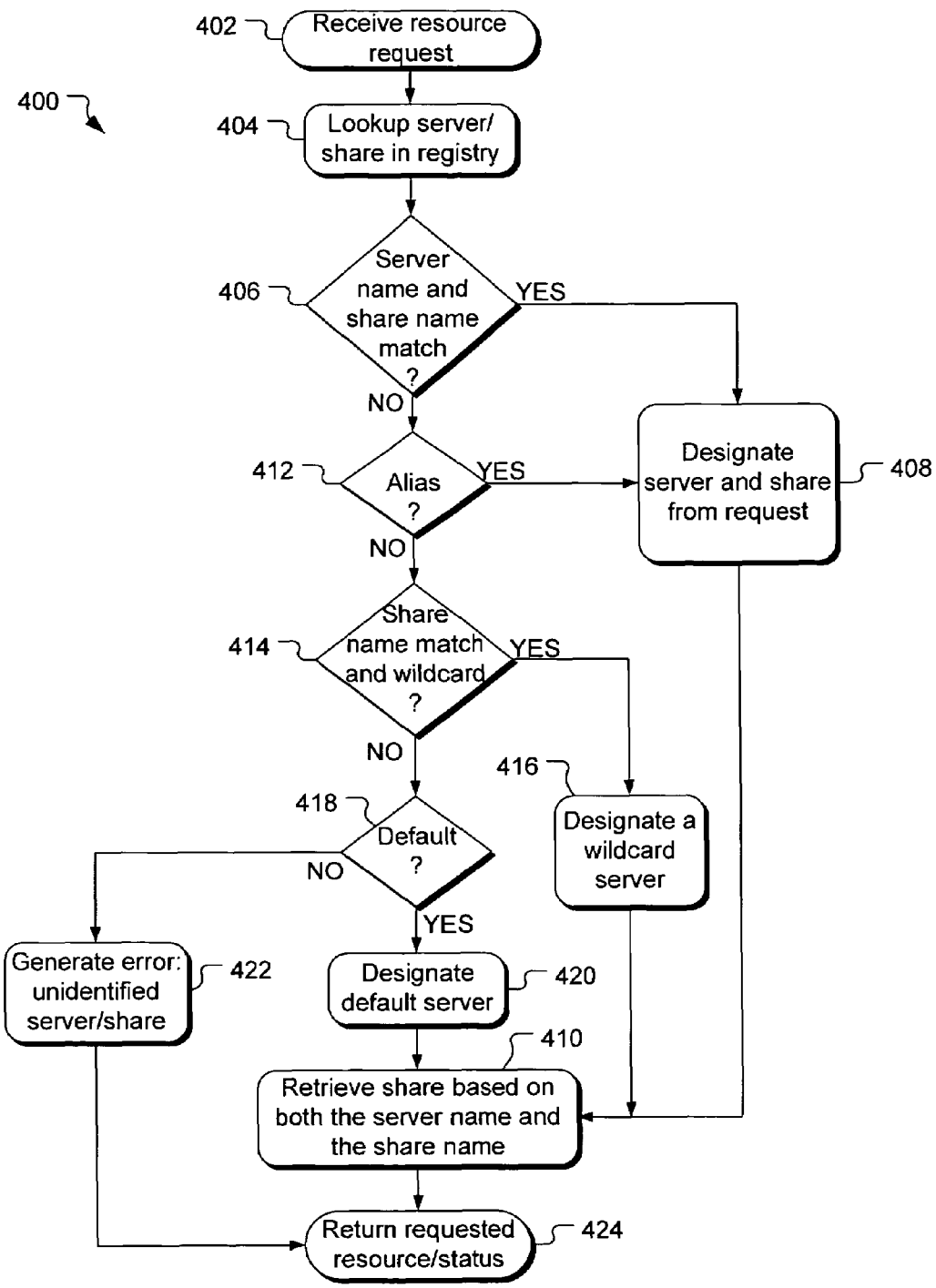
FIG. 4 illustrates a server resolution algorithm that may be used to serve network resources according to a virtual resource serving scheme.

The operations illustrated in FIG. 3 and FIG. 4 can be implemented in computer-readable executions, stored on computer readable media and executed by a microprocessor. The operations need not be performed in the order shown in FIG. 3 and FIG. 4; the operations themselves serve to illustrate one possible way for one skilled in the art to implement a virtual resource serving scheme. As such, the order of the operations may be changed in a particular implementation without departing from the spirit of the claimed subject matter.

FIG. 3 illustrates an exemplary registration algorithm or operation flow 300 that may be used to register servers, alias names, and a default server. The exemplary registration operation flow 300 can be performed by the registration module 204 and/or the registration API 222 (FIG. 2). Typically the registration operation 300 is performed on one or more servers at power-up, or prior to or during operation. The registration operation flow 300 may be called by applications running on a server, and may be repeated as necessary to register servers and shares.

A receiving operation 302 receives registration information from a source of registration information. The registration information contains server name, share name, alias, wildcard, default server, server network address, and other server configuration information. In one implementation, the registration information is read from a memory, such as a magnetic disk, which permanently stores the registration information, and stored in a random access memory (RAM) during operation. The registration information can be updated automatically or manually. For example, a new server on the network can register by claiming a server name and identifying its configuration information, including share names and network address. Alternatively, a system administrator can manually add and/or delete server configuration information from the registration information.

A first registering operation 304 registers one or more servers and share of the servers. The server's name is received and checked against other server names in a server registry. If the received server name has not already been used, the server name is stored in the registry in a server name field. One or more share names corresponding to shares provided by the server may be stored in share name fields in the server registry. A network address associated with the server may be stored in a network address field in the registry.

A second registering operation 306 registers one or more alias server names and target or destination server names. The alias server names are stored in alias fields in an alias registry along with a target server name that corresponds to the alias. As discussed, the alias can be any unique symbol or set of symbols that represent a server.

A third registering operation 308 registers a default server name that identifies a server to default to in the event that a requested server name is unrecognized in the server registry and the alias registry. The default server name can be stored along with the target server name in the alias registry or some other data structure. The registration operation flow 300 ends at return operation 310.

FIG. 4 illustrates a server name resolution algorithm or operation flow 400 that may be used to serve network resources according to a virtual resource serving scheme. The name resolution operation flow 400 can be carried out on one or more network computers. Portions of the name resolution operation 400 may be performed by a name resolution module, such as the name resolution module 206 (FIG. 2). For example, the name resolution API 224 (FIG. 2) may carry out operations shown in FIG. 4.

A receiving operation 402 receives a resource request. In one implementation, the resource request 402 is received over a network from a client. The resource request identifies a resource on a server that the client is attempting to access. The resource request includes a server name and a share name, wherein the server name identifies a server providing the requested resource, and the share name identifies the requested resource. The resource request may be received in a number of formats, including, but not limited to, the Universal Naming Convention (UNC) format.

In the receiving operation 402, the requested server name may be in a number of formats, including, but not limited to, a network address (e.g., IP address), a DNS name, or a NetBIOS name. In addition, the server name may not correspond directly to the actual server that provides the requested resource. Due to changes, such as server configuration or protocol changes, or server identity changes or multiple server identities, the server that the client is requesting may not be the actual server that provides the requested share. As such, the name resolution operation 400 attempts to resolve the requested server and share to a destination server that provides the requested share.

A looking up operation 404 looks up the requested server name and the requested share name in a server registry. The looking up operation 404 attempts to determine a network address for the requested server. The looking up operation 404 can be carried out as a search on ASCII text in a table that associates server names with network addresses. Alternatively, the looking up operation 404 may includes a mapping from the requested server/share name to a network address. The looking up operation 404 outputs a status indicating whether the look up operation successfully identified a network address.

A determining operation 406 determines whether the looking up operation 404 successfully identified a network address associated with the requested server/share. If so, a 'YES' path is taken to a designating operation 408, wherein the destination server is set to the server identified in the request. That is, the network address determined in the looking up operation 404 is used as the destination server address. The resource request is forwarded to the network address determined from the looking up operation 404.

In a retrieving operation 408, the destination server receives the resource request and uses both the server name and the share name to retrieve the requested share. Through share scoping, discussed above, the path to the requested share may have been qualified with a server name. Thus, both the server name and the share name are used to determine the path to the share at the destination server. As discussed above, by using both the server name and the share name to retrieve the requested share, issues such as namespace conflicts can be avoided.

Referring again to the determining operation 406, if it is determined that the looking up operation 404 did not successfully identify a network address for the requested server, a 'NO' path is taken to a second determining operation 412. The second determining operation 412 determines whether an alias has been registered for the requested server name. In one implementation, the second determining operation 412 looks up the requested server name in an alias registry that associates alias server names with actual servers. If the requested server name is determined to be an alias for another server name, the other server name is retrieved from the alias registry and a network address is determined for the other server.

If the second determining operation 412 determines that the requested server name is an alias for another server, a 'YES' branch is taken to the designating operation 408. As discussed, the designating operation 408 designates a destination address as the network address that was determined for the requested server.

If the second determining operation 412 determines that the requested server name is not an alias for another server, a 'NO' branch is taken to a third determining operation 414. The third determining operation 414 determines whether the requested share name matches a registered share name and the requested share name is associated with a wildcard server name. If the third determining operation 414 determines that the requested share name is registered with a wildcard server name, a 'YES' branch is taken to a second designating operation 416.

The second designating operation 416 sets the destination server to a registered server based on the wildcard share. The designating operation 416 chooses one of the registered servers associated with the share name provided in the request. The designating operation 416 then sends the resource request to the destination server. In the retrieving operation 410, the destination server uses both the server name and the share name to retrieve the requested resource.

Referring again to the third determining operation 414, if the requested share is not registered with a wildcard server name, the name resolution operation 400 branches 'NO' to a fourth determining operation 418. The fourth determining operation 418 determines whether a default server has been registered. One implementation of the fourth determining operation 418 looks up a default server name in a registry, such as the server registry or the alias registry.

If the fourth determining operation 418 determines that a default server has been registered, the name resolution operation 400 branches 'YES' to a designating operation 420. The third designating operation 420 sets the destination server to the registered default server. The resource request is sent to the registered default server. The retrieving operation 410 then retrieves the requested resource as discussed above.

If the fourth determining operation 418 determines that no default server has been registered, the name resolution operation 400 branches 'NO' to a generating operation 422. The generating operation 422 generates an error indicating that the requested server or requested share are unidentified. A returning operation 424 returns the requested resource if the requested resource was identified and retrieved. The returning operation 424 also returns a status to the requesting client, wherein the status indicates whether the requested resource was successfully retrieved.

Figure 5:
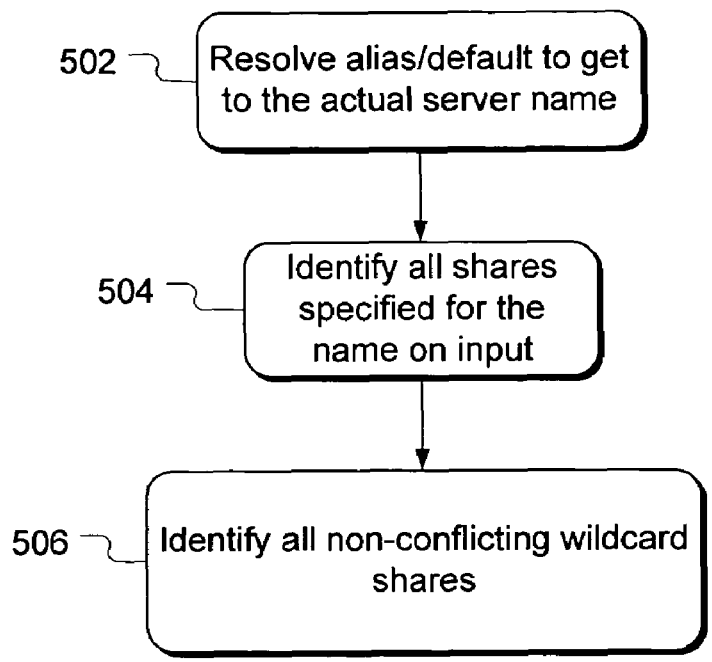
FIG. 5 illustrates an enumeration algorithm that may be used to enumerate shares on servers implementing a virtual resource serving scheme.

FIG. 5 illustrates an enumeration algorithm 500 that may be used to enumerate shares on servers implementing a virtual resource serving scheme. The enumeration algorithm 500 advantageously allows for enumerating shares that are is scoped across one or more virtual servers. For example, an application program that is share scoping-aware can request that all shares (qualified as \\SERVER\SHARE, instead of just "SHARE") be returned in response to an enumeration request. This can allow system administrators or other users to understand the abstraction.

In addition, scoping the share enumeration on server name can preserve the logical separation of shares from a client's perspective. Many applications that may interact with shared resources may be designed to treat virtual servers as separate. In such applications, the fact that multiple virtual servers are hosted on the same physical server should be made transparent to the applications. The enumeration algorithm 500 can provide such transparency. The exemplary enumeration algorithm 500 receives an enumeration request from an application that specifies a server name.

A resolving operation 502 resolves the alias or default server name to obtain an actual server name as discussed above. After the server name has been resolved, an identifying operation 504 identifies all the shares specified for the requested server name. The identifying operation 504 includes the identified shares in an enumeration to be returned to the requesting application. A wildcard identifying operation 506 identifies all the wildcard shares corresponding to server names that do not conflict with the alias, default, or actual server names in the resolving operation 502. The shares identified in the identifying operation 504 and the wildcard identifying operation 506 are combined and returned to the requesting application.

Exemplary Computer and/Computing System

FIG. 6 illustrates one operating environment 610 in which the various systems, methods, data structures, and application programming interfaces (APIs) described herein may be implemented. The exemplary operating environment 610 of FIG. 6 includes a general purpose computing device in the form of a computer 620, including a processing unit 621, a system memory 622, and a system bus 623 that operatively couples various system components include the system memory to the processing unit 621. There may be only one or there may be more than one processing unit 621, such that the processor of computer 620 comprises a single central-processing unit (CPU), or a plurality of processing units, commonly referred to as a parallel processing environment. The computer 620 may be a conventional computer, a distributed computer, or any other type of computer.

The system bus 623 may be any of several types of bus structures including a memory bus or memory controller, a peripheral bus, and a local bus using any of a variety of bus architectures. The system memory may also be referred to as simply the memory, and includes read only memory (ROM) 624 and random access memory (RAM) 625. A basic input/output system (BIOS) 626, containing the basic routines that help to transfer information between elements within the computer 620, such as during start-up, is stored in ROM 624. The computer 620 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 are connected to the system bus 623 by a hard disk drive interface 632, a magnetic disk drive interface 633, and an optical disk drive interface 634, respectively. The drives and their associated computer-readable media provide nonvolatile storage of computer-readable instructions, data structures, program modules and other data for the computer 620. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 629, optical disk 631, ROM 624, or RAM 625, including an operating system 635, one or more application programs 636, other program modules 637, and program data 638. At least one of the application programs 636 includes computer executable instructions for performing virtual resource serving.

A user may enter commands and information into the personal computer 620 through input devices such as a keyboard 640 and pointing device 642. Other input devices (not shown) may include a microphone, joystick, game pad, satellite dish, scanner, or the like. These and other input devices are often connected to the processing unit 621 through a serial port interface 646 that is coupled to the system bus, but may be connected by other interfaces, such as a parallel port, game port, or a universal serial bus (USB). A monitor 647 or other type of display device is also connected to the system bus 623 via an interface, such as a video adapter 648. In addition to the monitor, computers typically include other peripheral output devices (not shown), such as speakers and printers.

The computer 620 may operate in a networked environment using logical connections to one or more remote computers, such as remote computer 649. These logical connections may be achieved by a communication device coupled to or a part of the computer 620, or in other manners. The remote computer 649 may be another computer, a server, a router, a network PC, a client, a peer device or other common network node, and typically includes many or all of the elements described above relative to the computer 620, although only a memory storage device 650 has been illustrated in FIG. 6. The logical connections depicted in FIG. 6 include a local-area network (LAN) 651 and a wide-area network (WAN) 652. Such networking environments are commonplace in office networks, enterprise-wide computer networks, intranets and the Internal, which are all types of networks.

When used in a LAN-networking environment, the computer 620 is connected to the local network 651 through a network interface or adapter 653, which is one type of communications device. When used in a WAN-networking environment, the computer 620 typically includes a modem 654, a type of communications device, or any other type of communications device for establishing communications over the wide area network 652. The LAN 651 and/or the WAN 652 can include wired networks, wireless networks, or any combination of wired or wireless networks.

The modem 654, which may be internal or external, is connected to the system bus 623 via the serial port interface 646. In a networked environment, program modules depicted relative to the personal computer 620, or portions thereof, may be stored in the remote memory storage device. It is appreciated that the network connections shown are exemplary and other means of and communications devices for establishing a communications link between the computers may be used.

Although some exemplary methods, devices and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A system comprising:
   one or more processing units;
   a server registry including one or more registered server names of associated network servers;
   an alias registry including at least one alias server name associated with at least one of the one or more registered server names;
   a first share from a first consolidated server, wherein the server name of the first share comprises the first share name qualified with the first consolidated server name;
   a second share from a second consolidated server, wherein the server name of the second share comprises the second share name qualified with the second consolidated server name; and
   a name resolution module for:
   receiving a request for a network resource, the request having a server name identifying a requested server and a share name identifying the network resource;
   determining whether the requested server name is registered;
   when the requested server is not registered, looking up the requested server name in the alias registry to determine a registered server name; and
   resolving a request for the share based on a combination of the name of the consolidated server and the share name.

2. The system as recited in claim 1 wherein the server registry further includes a wildcard server name associated with at least one share.

3. The system as recited in claim 1 further comprising a network receiver receiving a request in a universal naming convention (UNC) format.

4. The system as recited in claim 1 further comprising a registration module registering one or more alias server names in the alias registry.

5. The system as recited in claim 1 further comprising a registration module registering a default server name associated with at least on share in the server registry.

6. The system as recited in claim 1 wherein the registration module comprises a registration application programming interface (API).

7. The system as recited in claim 1 wherein the name resolution module further maps a domain name system (DNS) server name to at least one of a network basic input/output system (NetBIOS) name and an Internet Protocol Address.

8. A method comprising:
configuring a server with a first share from a first consolidated server and a second share from a second consolidated server;
qualifying the first share name with the first consolidated server name and the second share name with the second consolidated server name;
receiving a request for a network resource, the request having a server name identifying a requested server and a share name identifying the network resource;
determining whether the requested server name is registered in a server registry;
determining whether the requested server name is an alias server name corresponding to a target server name, when the requested server name is not registered in the server registry; and
retrieving the requested share based on a combination of the requested share name and the requested server name.

9. The method as recited in claim 8 wherein the determining whether the requested server name is registered comprises determining whether a wildcard server name is registered in association with the requested share name.

10. The method as recited in claim 8 wherein the receiving operation comprises receiving a request in a universal naming convention (UNC) format.

11. The method as recited in claim 8 wherein the determining whether the requested server name is an alias server name comprises searching for the requested server name in an alias registry comprising one or more alias server names, each alias server name associated with a target server.

12. The method as recited in claim 11 further comprising directing the resource request to a target server corresponding to the requested server name when the requested server name is found in the alias registry.

13. The method as recited in claim 8 further comprising registering one or more alias server names with a corresponding target server name, the target server name being a registered server name.

14. The method as recited in claim 8 further comprising registering a default server name associated with a registered server name.

15. The method as recited in claim 8 further comprising determining whether the requested share name is registered with a wildcard server name when the requested server is not an alias server name.

16. The method as recited in claim 15 further comprising determining a default server name when no wildcard server name is registered for the requested share.

17. The method as recited in claim 8 wherein the determining whether the requested server name is an alias server name comprises mapping a domain name system (DNS) server name to a network basic input/output system (NetBIOS) name.

18. A computer-readable storage medium having stored thereon computer-executable instructions for causing a computer to perform a method comprising:

receiving a request for a network resource, the request having a server name identifying a requested server and a share name identifying the network resource;
determining whether the requested server name is registered in a server registry;
determining whether the requested server name is an alias server name corresponding to a target server name when the requested server name is not registered in the server registry, the determining including searching for the requested server name in an alias registry comprising one or more alias server names, each alias server name associated with a target server;
directing the resource request to a target server corresponding to the requested server name when the requested server name is found in the alias registry; and
identifying the requested share at a destination server using a consolidated server name and the share name, wherein the consolidated server has been consolidated onto the destination server.

19. The computer-readable storage medium as recited in claim 18 wherein the determining whether the requested server name is registered comprises determining whether a wildcard server name is registered in association with the requested share name.

20. The computer-readable storage medium as recited in claim 18 wherein the receiving operation comprises receiving a request in a universal naming convention (UNC) format.

21. The computer-readable storage medium as recited in claim 18, the method further comprising registering one or more alias server names with a corresponding target server name, the target server name being a registered server name.

22. The computer-readable storage medium as recited in claim 18, the method further comprising registering a default server name associated with a registered server name.

23. The computer-readable storage medium as recited in claim 18, the method further comprising determining whether the requested share name is registered with a wildcard server name when the requested server is not an alias server name.

24. The computer-readable storage medium as recited in claim 23, the method further comprising determining a default server name when no wildcard server name is registered for the requested share.

25. The computer-readable storage medium as recited in claim 18 wherein the determining whether the requested server name is an alias server name comprises mapping a domain name system (DNS) server name to a network basic input/output system (NetBIOS) name.

26. The computer-readable storage medium as recited in claim 18 further comprising enumerating one or more shared resources associated with the consolidated server, the one or more shared resources provided virtually by the destination server.

27. The computer-readable storage medium as recited in claim 25 wherein the enumerating operation comprises:
resolving the requested server to an actual server based on either a default server name or an alias server name;
identifying shares associated with the actual server;
identifying non-conflicting wildcard shares associated with the actual server.

* * * * *

UNITED STATES PATENT AND TRADEMARK OFFICE
CERTIFICATE OF CORRECTION

PATENT NO.        : 7,418,507 B2                                    Page 1 of 1
APPLICATION NO.   : 10/740974
DATED             : August 26, 2008
INVENTOR(S)       : David Kruse It is certified that error appears in the above-identified patent and that said Letters Patent is hereby corrected as shown below:

In column 5, line 63, after "and" delete "≡" and insert -- \\NT4-C\Files. --, therefor.

In column 16, line 55, in Claim 27, delete "25" and insert -- 24 --, therefor.

Signed and Sealed this
Third Day of May, 2011

David J. Kappos
*Director of the United States Patent and Trademark Office*